United States Patent [19]

Smithgall et al.

[11] Patent Number: 5,316,562
[45] Date of Patent: May 31, 1994

[54] OPTICAL FIBER TENSION MONITORING TECHNIQUE

[75] Inventors: David H. Smithgall, East Windsor, N.J.; Alan T. Woodward, Lilburn, Ga.

[73] Assignee: AT&T Bell Laboratories, Murray Hill, N.J.

[21] Appl. No.: 909,238

[22] Filed: Jul. 6, 1992

Related U.S. Application Data

[63] Continuation of Ser. No. 799,224, Nov. 27, 1991, Pat. No. 5,228,893.

[51] Int. Cl.$^5$ .................................................. C03B 37/023
[52] U.S. Cl. .................................. 65/3.11; 65/13; 65/29; 65/162; 73/581; 73/862.41; 250/559; 356/429
[58] Field of Search ...................... 65/2, 3.11, 3.12, 13, 65/12, 29, 162; 73/579, 580, 862.41, 581; 250/559; 356/385, 429

[56] References Cited

U.S. PATENT DOCUMENTS

| | | | |
|---|---|---|---|
| 3,912,478 | 10/1975 | Presby | 65/2 |
| 4,294,545 | 10/1981 | Stutz | 356/386 |
| 4,393,725 | 7/1983 | Satterfield | 73/862.41 |
| 4,450,333 | 5/1984 | Andrejco et al. | 219/10.49 |
| 4,655,093 | 4/1987 | Strom et al. | 73/862.41 |
| 4,692,615 | 9/1987 | Mensah et al. | 250/231 |
| 4,792,931 | 12/1988 | Nishida et al. | 367/149 |
| 4,957,526 | 9/1990 | Frazee et al. | 65/3.11 |
| 5,079,433 | 1/1992 | Smith | 250/561 |
| 5,113,708 | 5/1992 | Bode et al. | 78/862.41 |
| 5,130,557 | 7/1992 | Kettl | 250/561 |

OTHER PUBLICATIONS

"An On-Line Fiber Drawing Tension and Diameter Measurement Device," P. L. Chu et al., *Journal of Lightwave Technology*, vol. 7, No. 2, Feb. 1989, pp. 255–261.
"Non-Contact Measurement of Optical Fiber Draw Tension," C. G. Askins et al., *Journal of Lightwave Technology*, vol. 9, No. 8, Aug. 1991, pp. 945–947.

*Primary Examiner*—Robert L. Lindsay
*Attorney, Agent, or Firm*—Roderick B. Anderson

[57] ABSTRACT

As an optical fiber (12) is being drawn, air (14) is directed at a portion of the fiber as a succession of air pulses, the pulses having a frequency near the natural frequency of the fiber portion. The frequency of the air pulses is then varied over a range of frequencies that includes the natural frequency of the fiber portion. When the air pulse frequency equals the natural frequency of the fiber portion, a resonance occurs which greatly amplifies the amplitude of the vibration of the fiber portion. The large deflection of the fiber that occurs at resonance is easy to detect, and the air pulse frequency which causes such maximum deflection is taken as being equal to the resonant frequency and therefore to the natural frequency of the fiber portion. Changes of the detected resonant frequency can be interpreted in a straightforward manner as changes in optical fiber tension which, in turn, are used to make compensatory changes of the temperature of the furnace (10).

10 Claims, 2 Drawing Sheets

OPTICAL FIBER TENSION MONITORING TECHNIQUE

This is a continuation of application Ser. No. 07/799,224, filed Nov. 27, 1991, now U.S. Pat. No. 5,228,893, issued Jul. 20, 1993.

TECHNICAL FIELD

This invention relates to optical fiber tension monitoring techniques and, more particularly, to non-contact methods for monitoring optical fiber tension during optical fiber fabrication.

BACKGROUND OF THE INVENTION

Since optical fiber communications have become increasingly widespread, the fabrication of optical fibers has been a subject of intensive research and development. Optical fibers are normally made in a continuous process which involves drawing a thin glass strand or fiber from a partially molten glass preform and thereafter coating it with a polymer to increase its structural strength. The U.S. patent of Andrejco et al., U.S. Pat. No. 4,450,333, granted May 22, 1984, hereby incorporated herein by reference, describes in detail a furnace of the type that can be used to partially melt a glass preform to permit a fiber to be drawn.

The U.S. patent of Frazee et al., U.S. Pat. No. 4,957,526, granted Sep. 18, 1990, is directed to methods for monitoring coatings on the fiber and feeding back information for adjusting the coatings during real time as the fiber is being fabricated. The patent describes the use of a computer for controlling the fabrication process and the importance of reducing the cost and increasing the reliability of such methods.

The heat of the furnace and the rate of draw of the fiber must be in a proper balance so that the fiber cab be drawn continuously under uniform conditions. This balance is normally accomplished by monitoring the tension of the fiber while drawing the fiber at a uniform rate, typically between one and ten meters per second. If the tension rises above a prescribed value, the heat of the furnace is typically raised which results in a reduced tension. Likewise, the furnace temperature is lowered in response to the tension falling below a prescribed range of values. Fiber tension may be measured by threading the fiber through three rollers or wheels and detecting the displacement of the middle roller which is a function of fiber tension.

It has been recognized that this conventional method of monitoring tension tends to weaken the fiber and may make it unsuitable for further use. Further, it cannot be used at very high draw speeds. Consequently, workers sometimes measure the fiber tension at a low draw speed and use that measurement to predict tension at an elevated draw speed, which may lead to inaccurate results.

The paper, "An On-Line Fiber Drawing Tension and Diameter Measurement Device," P. L. Chu et al., *Journal of Lightwave Technology*, Vol. 7, No. 2, February 1989, pp. 255-261, describes a non-contact tension monitoring device which directs unpolarized light transversely through the fiber and then uses the retardation of the scattered light from the fiber to determined the fiber tension. While the method avoids the problems associated with rollers that contact the fiber, it is difficult to implement because its accuracy is degraded by the axial movement of the fiber, residual thermal stress, and any ovality of the outer diameter of the fiber, The paper, "Non-Contact Measurement of Optical Fiber Draw Tension," C. G. Askins et al., *Journal of Lightwave Technology*, Vol. 9, No. 8, August 1991, pp. 945-947, and the U.S. patent of Mensah et al., No. 4,692,615, granted Sep. 8, 1987, are directed to non-contact tension monitoring which depends upon a measurement of a vibration of the fiber. The vibration may either occur naturally or may be excited by a puff of air. A complex wave-form describing the fiber vibration is taken and a Fourier transform of the wave-form is made to determine the fundamental frequency, or the natural frequency, of the vibrating fiber. From this, the tension of the fiber can be computed. Equipment for recording the waveform and computing the Fourier transform is required.

There remains a need in the industry for a non-contact tension monitoring technique which is relatively inexpensive to implement, and which provides a rapid determination of tension so that prompt adjustments in the furnace temperature can be made in response to it.

SUMMARY OF THE INVENTION

In accordance with the invention, as the fiber is being drawn, air is directed at a portion of the fiber as a succession of air pulses, the pulses having a frequency near the natural frequency of the fiber portion. The frequency of the air pulses is then varied over a range of frequencies that includes the natural frequency of the fiber portion. When the air pulse frequency equals the natural frequency of the fiber portion, a resonance occurs which greatly increases the amplitude of vibration of the fiber portion. The large deflection of the fiber that occurs at resonance is easy to detect, and the air pulse frequency which causes such maximum deflection is taken as being equal to the resonance frequency and therefore to the natural frequency of the fiber portion. Changes of the detected resonant frequency can be interpreted in a straightforward manner as changes in tension which, in turn, are used to make compensatory changes of the temperature of the furnace.

The air pulses are preferably formed by directing a continuous air stream through a chopper wheel, which may simply be a wheel with a peripheral array of holes for permitting intermittent passage of the air stream. The air pulse frequency is then easily scanned or varied by using a variable speed motor to vary the rotational frequency of the chopper wheel. The maximum deflection of the fiber portion can be detected by using the same laser and photodector apparatus that is used for measuring the diameter of the optical fiber, as will be described more fully later. It will be appreciated that all of the components used for monitoring fiber tension are relatively inexpensive, require little modification of existing control apparatus, and are quickly responsive to changes in fiber tension.

These and other objects, features, and benefits of the invention will be better understood from a consideration of the following detailed description taken in conjunction with the accompanying drawing.

DETAILED DESCRIPTION

Figure 1:
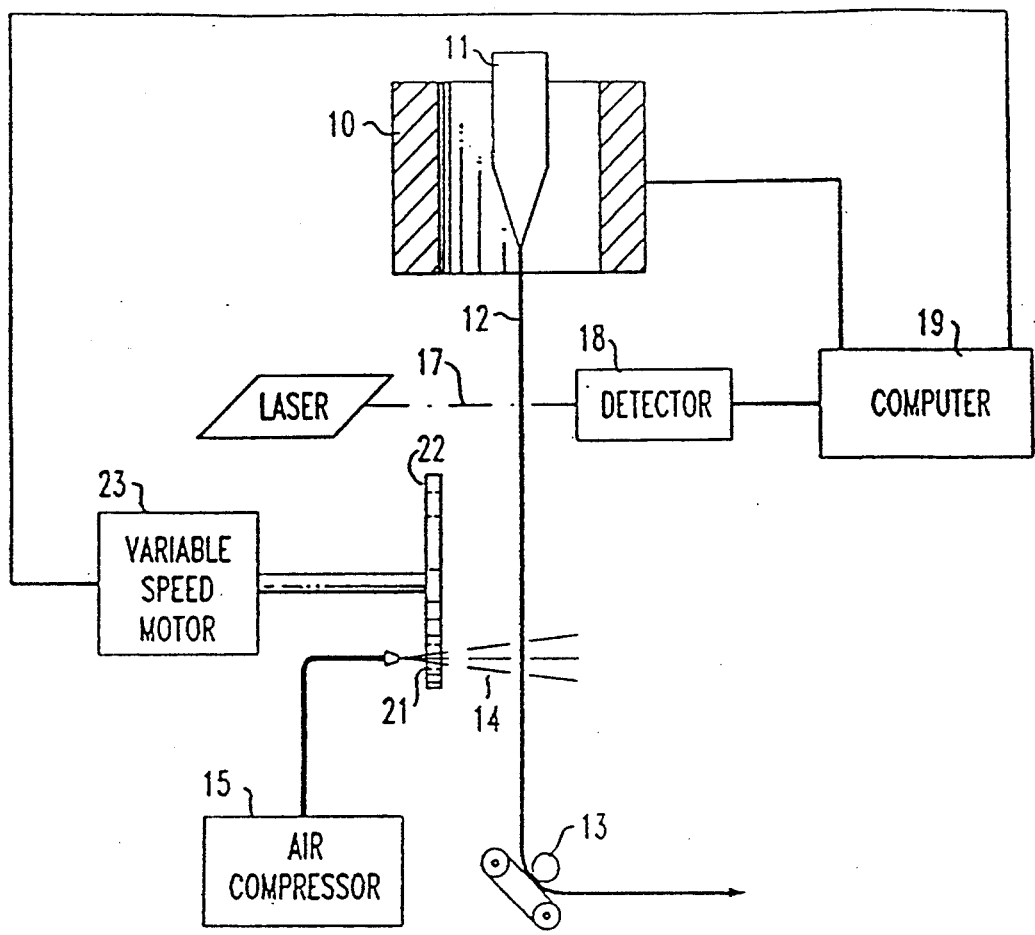
FIG. 1 is a schematic illustration of apparatus for monitoring optical fiber tension in accordance with an illustrative embodiment of the invention.

Referring now to FIG. 1, there is shown schematically apparatus for fabricating optical fiber comprising a furnace 10 which heats a glass optical fiber preform 11 to a partially molten condition so that an optical fiber 12 can be drawn from it. The furnace may be of a design described in the aforementioned Andrejco patent. The preform 11 is slowly fed into the furnace so that eventually it is substantially entirely converted to optical fiber. It is conventional to use apparatus such as that shown at 13 for drawing the fiber at a substantially constant rate of speed, typically between one and ten meters per second. As is known, the proper balance between furnace temperature for melting the glass and draw speed can be made by monitoring the tension of the optical fiber 12; if the tension becomes too high, the furnace temperature is raised to allow continuous drawing of the fiber without breaking or damage at the rate of speed. If the fiber tension becomes too low, it is indicative that the furnace temperature is somewhat too high and should be lowered to maintain a proper balance.

In accordance with the invention, the fiber 12 is caused to vibrate by means of an air stream 14 of periodic pulses applied by an air compressor 15. The amplitude of the vibrations are detected by directing laser light 17 transversely to the fiber which is detected by a light detector 18. The output of the detector 18 is directed to a computer 19 which is preferably a computer that is used to control all aspects of the fiber draw process.

Figure 2:
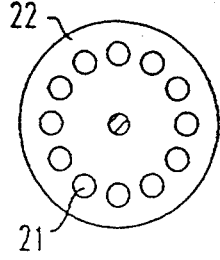
FIG. 2 is a view of the chopper wheel of FIG. 1.

Referring to FIGS. 1 and 2, the air from compressor 15 is directed by a stationary nozzle through a circumferential arrangement of apertures 21 in a chopper wheel 22 that is caused to rotate by a variable speed motor 23. The circumferential array of apertures 21 are regularly spaced so that, as the wheel 22 rotates, the air stream 14 constitutes a succession of pulses or puffs of air, the frequency of the air pulses being directly proportional to the rotational frequency of the chopper wheel 22. The air pulse frequency may be initially selected to be slightly below the natural vibrational frequency of the optical fiber portion 12 which is impinged by the air stream 14. That is, any fiber portion suspended between two points will have an inherent single fundamental or natural frequency at which it tends to vibrate when excited. The invention provides a quick method of determining that natural frequency from which the tension of the optical fiber 12 can be deduced. This is accomplished by increasing the speed of the motor so that the frequency of the air pulses matches the natural frequency of the optical fiber portion which creates a resonance of the air pulse frequency with the vibrations of the optical fiber. The frequency at which resonance occurs, or the resonant frequency, is equal to the natural frequency of the optical fiber portion; it is also equal to the air pulse frequency at which resonance occurs.

Figure 3:
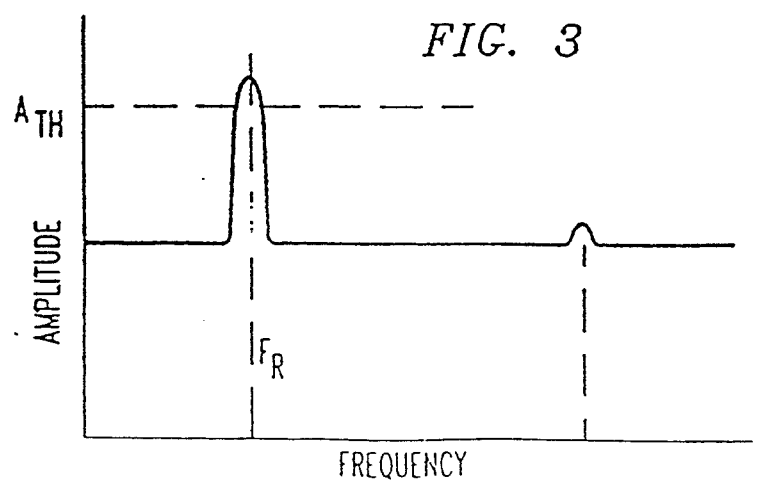
FIG. 3 is a view of the amplitude of vibrations of a portion of the optical fiber of FIG. 1 versus the frequency of such vibrations.

This phenomenon is illustrated in FIG. 3 which is a graph of the amplitude of the optical fiber vibrations versus the frequency of the applied air pulses. At frequencies below resonance, the air pulses produce an amplitude of vibrations of the fiber portion which is relatively low. When the air pulse frequency equals the natural frequency of the optical fiber, resonance occurs, which causes a steep increase in the amplitude of vibrations which is shown at the frequency $F_R$, the resonant frequency. At harmonics of the resonant frequency $F_R$, increased amplitude may also occur, but these increases are much smaller than the amplitudes occurring at fundamental resonance.

Because of the large increase in amplitude at the resonant frequency $F_R$, it is easy to determine precisely the time at which such an increase took place. We prefer to use the laser beam and detector 18 for determining the time at which such an amplitude jump took place, but any of various devices could be used for detecting such an increase in amplitude. The air pulse frequency at the time that resonance occurs may be taken as being equal to the resonant frequency $F_R$ and also as being equal to the natural frequency of the optical fiber 12. Thus, the speed of rotation of the chopper 22 is directed to computer 19, and the computer is programmed to note the rotational frequency (which is proportional to the fiber natural frequency) when the maximum amplitude is detected by detector 18.

It is known that the tension, s, of a fiber portion can be calculated from the formula $$s = c(f_1 L d)^2$$

where c is a constant, $f_1$ is a natural frequency of the fiber portion, L is the length of the fiber portion, and d is the diameter of the fiber portion. As is known, the constant c is dependent on the material from which the optical fiber is made, and for silica fibers is typically $7.1 \times 10^{-10}$ (with $f_1$ measured in hertz, d in microns, L in meters, and s in kilograms). The frequency $f_1$ is taken as being equal to the air pulse frequency at resonance, which is directly proportional to the speed of the motor that is inputted to the computer. The computer 19 computers from this information fiber tension and adjusts the temperature of the furnace 10 accordingly, which is illustrated by the interconnection of the computer to the furnace 10. That is, if measured fiber tension falls outside a predetermined range, a compensatory change of the furnace temperature is automatically made.

An important advantage of the invention is that the apparatus required is simple and inexpensive to install and maintain. Referring to FIG. 3, in principle, the invention would work merely with apparatus that determines the time at which the vibration amplitude exceeds some threshold $A_{TH}$, and then measures the air pulse frequency at that time. This could be done by a photodetector that is displaced so as to receive light only when a fiber deflection exceeding $A_{TH}$ has occurred. In practice, we prefer to use a laser and detection system that is used for real time optical fiber diameter measurement. This system is described in the paper, "Improved Real Time Optical Fiber Diameter Measurement System," D. H. Smithgall et al., *Technical Digest of the Conference on Lasers and Electo-Optics*, Feb. 26-28, 1980, pp. 10-11. This apparatus determines optical fiber diameter from the scattering pattern of the laser beam 17, and it is straightforward to modify it to detect the large amplitude of vibration change illustrated in FIG. 3.

It should also be noted that the computation of tension from a reading of a specific motor frequency is so simple that it can be made virtually instantaneously. That is, the computer 19 can easily be programmed to convert the readings of frequency directly to readings of tension. No new computer hardware is required as would be the case, for example, if a Fourier transform of a plotted curve of fiber vibration were required, as is true of certain of the prior art. The responsiveness of the invention is particularly important at high draw speeds since it is intended that the invention be used in real time during fiber fabrication as the fiber is moving axially. The low cost of the modifications for providing tension measurement is also an important consideration since optical fiber is now considered a commodity product, for which cost of production is important.

The chopper wheel 22 of FIG. 2 is just one of many designs that could be used for regularly interrupting the air flow; this design was selected because it can easily be made simply by drilling holes 21 in the wheel. A fan-shaped rotatable member could alternatively be used. In theory, one could use a solenoid operated valve to interrupt the air flow, but such apparatus would require somewhat more design and maintenance than that shown. For the fibers we have tested, the range of frequencies of the air pulses has been between about six and twenty hertz (cycles per second). Designing a readily available variable speed motor and chopper wheel to give this frequency variation is simple, and such motors are reliable and their accuracy dependable.

Figure 4:
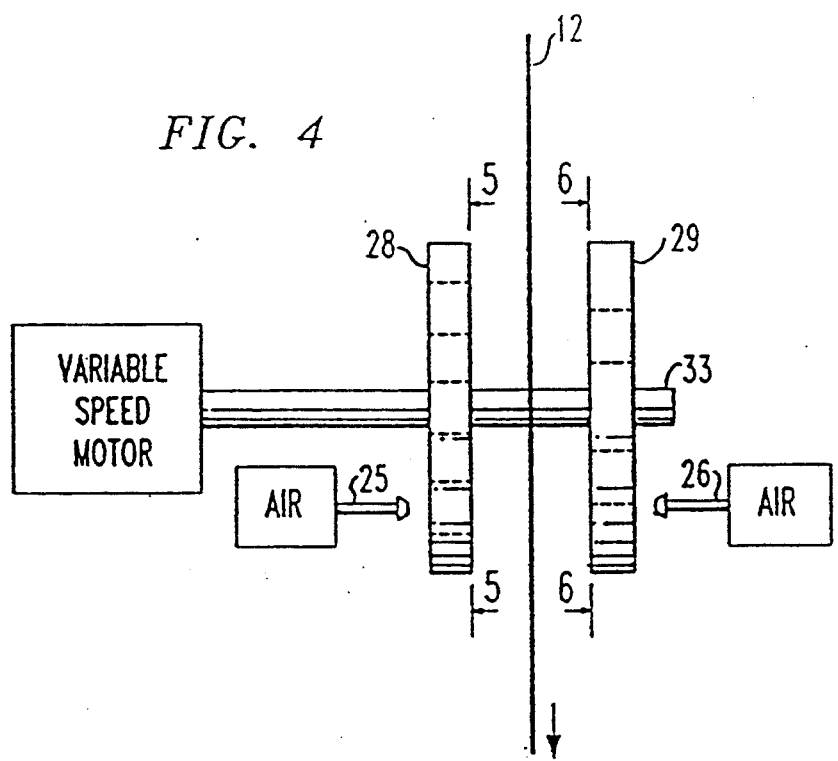
FIG. 4 illustrates a modification of the embodiment of FIG. 1.
Figure 5:
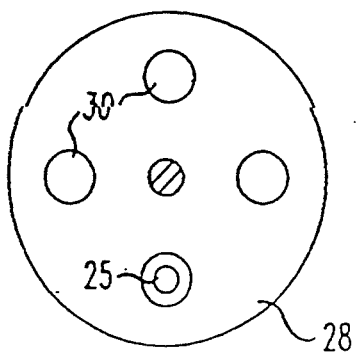
FIGS. 5 and 6 are views taken along lines 5—5 and 6—6, respectively, of FIG. 4.
Figure 6:
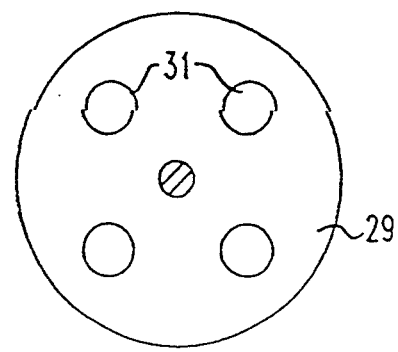

Referring now to the modification shown in FIG. 4, to make the air pulse forces on the optical fiber 12 symmetric with respect to the transverse vibration, we prefer to apply the air pulse on opposite sides of the optical fiber 12 using oppositely arranged air nozzles 25 and 26. The air is directed through chopper wheels 28 and 29, respectively shown in FIGS. 5 and 6. The apertures 30 in chopper wheel 28 are angularly displaced with respect to the apertures 31 of chopper wheel 29 such that the air pulses applied through chopper wheel 28 are one hundred eighty degrees out of phase with respect to those applied through chopper wheel 29. The two chopper wheels are mounted on a common rotatable axis 33 and rotate at the same frequency as the FIG. 1 embodiment. At resonance, air pulse are applied at opposite sides of the fiber during each half cycle of vibration which tends to increase the amplitude spike at $F_R$ shown in FIG. 3.

The embodiments shown are intended to be merely illustrative of the inventive concept involved. Various other embodiments and modifications may be made by those skilled in the art without departing from the spirit and scope of the invention.

We claim:

1. A method for making optical fiber comprising the steps of:

heating in a furnace an optical fiber perform to a partially molten condition;

drawing an optical fiber from the partially molten preform;

as the fiber is being drawn, directing air at a portion of the fiber as a succession of air pulses, the pulses having frequency near the natural frequency of the portion of the fiber;

varying the frequency of the air pulses so as to produce a resonance of the frequency of vibration of the optical fiber portion with the air pulse frequency at a specific air pulse frequency;

detecting said resonance of the frequency of vibration of the optical fiber with the air pulse frequency, thereby indicating that the air pulse frequency that produces said resonance equals the natural frequency of the fiber portion;

and monitoring changes of the natural frequency of the optical fiber portion, thereby to monitor changes of tension applied to the optical fiber portion.

2. The method of claim 1 wherein:

the tension s of the optical fiber portion is calculated from the formula $$s = c(f_1 L d)^2$$

where c is a constant, $f_1$ is the natural frequency of the fiber portion, L is the length of the fiber portion, and d is the diameter of the fiber portion.

3. The method of claim 1 further comprising the step of:

using the monitored changes of tension to control the temperature of said furnace.

4. The method of claim 3 wherein:

the step of controlling the heat comprises the step of raising the temperature in the furnace in response to the fiber tension rising above a prescribed value, and lowering the temperature in the furnace in response to the fiber tension falling below another prescribed value.

5. The method of claim 1 wherein:

the detecting comprises the step of directing light transversely at the fiber and detecting light scatted from the fiber.

6. The method of claim 1 wherein:

the directing air step comprises the step of directing air pulses at opposite sides of the optical fiber.

7. The method for making glass fiber comprising the steps of:

heating in a furnace a glass preform to a partially molten condition; drawing a glass fiber from the partially molten preform; monitoring a tension applied to a portion of the glass fiber as a fiber is being drawn; and controlling the temperature of the furnace in response to the monitored tension; wherein:

the monitoring step comprises the steps of: (a) directing air pulse of a regularly frequency against said portion of said glass fiber; (b) varying the frequency of the air pulses with respect to time; (c) detecting a large displacement of the vibrating fiber portion due to resonance thereof; and (d) using information relating to the air pulse frequency at the time of said resonance for computing said tension.

8. The method of claim 7, wherein:

said resonance results from the air pulse frequency becoming substantially equal to a natural characteristic frequency of said portion of said glass fiber.

9. The method of claim 7 wherein:

the glass fiber is an optical fiber.

10. The method of claim 7 wherein:

the step of using information comprises the step of using a computer to generate an output signal in response to an input signal concerning air pulse frequency at resonance, said output signal being used to control the temperature of said furnace.

* * * * *